United States Patent [19]

El-Shoubary et al.

[11] Patent Number: 5,430,232
[45] Date of Patent: Jul. 4, 1995

[54] ENHANCED VOLATILIZATION OF POLYCHLORINATED BIPHENYL COMPOUNDS

[75] Inventors: Youssef El-Shoubary, Clifton Park; Norman Z. Shilling, Schenectady; Jimmy L. Webb, Ballston Lake, all of N.Y.

[73] Assignee: General Electric Company, N.Y.

[21] Appl. No.: 254,628

[22] Filed: Jun. 6, 1994

[51] Int. Cl.6 ............................ B09B 3/00; B08B 3/00
[52] U.S. Cl. ................................. 588/209; 588/213; 588/214; 588/228; 588/230
[58] Field of Search ............... 588/209, 213, 214, 228, 588/230

[56] References Cited

U.S. PATENT DOCUMENTS

| | | | |
|---|---|---|---|
| 4,606,774 | 8/1986 | Morris | 134/10 |
| 4,841,998 | 6/1989 | Bruya | 134/10 |
| 5,220,109 | 6/1993 | Commandeur et al. | 588/209 |
| 5,325,795 | 6/1994 | Nelson et al. | 110/236 |

*Primary Examiner*—John Niebling
*Assistant Examiner*—Arun S. Phasge
*Attorney, Agent, or Firm*—James Magee, Jr.

[57] ABSTRACT

Polychlorinated biphenyls and chlorinated hydrocarbons are separated from soil by oil assisted desorption followed by vacuum stripping in presence of a sweep gas.

6 Claims, No Drawings

ENHANCED VOLATILIZATION OF POLYCHLORINATED BIPHENYL COMPOUNDS

This invention is directed to decontamination of soils and other particulate materials such as soil, sand, gravel, crushed concrete, sludges, sediments and the like by removal of volatile and semivolatile organic compounds, particularly halogenated compounds, such as polychlorinated biphenyl compounds and more particularly to decontamination of such materials by means of thermal desorption and volatilization of the contaminant compounds from the contaminated material in the presence of desorption promoting additives.

BACKGROUND OF THE INVENTION

Thermal desorption of polychlorinated biphenyl and other volatile organic compounds from porous matrices such as soil or concrete can be achieved by various methods of heating the matrix by direct application of heat assisted by vacuum, gas purging, and the like. The method of applying heat, collection of the volatilized materials, e.g., polychlorinated biphenyl, and by-product production has a significant impact on the acceptability of any such method.

U.S. Pat. No. 5,253,597 discloses a high vacuum assisted volatilization method and apparatus for low heat removal of polychlorinated biphenyl from soils and sludge. Polychlorinated biphenyl compounds removal by incineration and pyrolysis under low vacuum are also known. The temperature at which such processes are conducted generally depends on the nature of the contaminated material and the volatility of the target contaminant as well as other components of the material.

Another thermal desorption process involves treatment of a heated slurry with a mixture of an alkaline material and a sulfoxide.

Countercurrent stripping with a vapor at temperatures below the boiling point of the contaminants is also used.

SUMMARY OF THE INVENTION

In its broad aspects the invention comprises a process for desorption of volatile and semivolatile organic contaminants such as polychlorinated biphenyl compounds, and halogenated hydrocarbons, such as trichloroethylene, from inert porous materials such as soils, sand, concrete, sludges, and the like by desorption and volatilization in the presence of an organic additive which enhances desorption and volatilization of the contaminant. Effective additives are hydrocarbons and oils which solubilize the contaminant or which promote desorption of the contaminant from the soil and volatilization of the target contaminant. Effective additives have boiling points below the boiling point of the contaminant to be removed.

The desorption is enhanced with respect to temperature or the time required to reduce the concentration of the contaminant to an acceptable level. In preferred embodiments of the process of this invention the desorbtion and volatilization is carried out under reduced pressure.

Preferred compositions which can be used in the practice of this invention are non-toxic non-hazardous materials such as glycerin, kerosene, tung oil, mineral oil, cottonseed oil, linseed oil, and pine oil. The process of this invention can be used with any convenient apparatus and means for admixing the oil with the material to be cleaned and heating the material to a temperature sufficient to achieve the desired degree of desorption. Rotary kilns and furnaces, heating blankets, or thermal energy delivery devices such as microwave generators can be adapted for use in apparatus designed to carry out the process.

DESCRIPTION OF THE INVENTION

This invention provides a method or process for separating an organic chlorinated contaminant from an inert porous material which comprises admixing the material with an effective amount of a volatilizable organic liquid in which the contaminant is soluble, heating the admixture under vacuum to a temperature above the boiling point of the organic liquid but below the decomposition temperature of the organic liquid and the contaminant, while maintaining a flow of an inert sweep gas through the porous material, and collecting the vapors for further treatment or destruction.

Polychlorinated biphenyl compounds can be efficiently desorbed and separated from porous materials such as sand, concrete, soil, and the like by a process which comprises admixing the contaminated material with an oil or hydrocarbon additive in which the contaminant is soluble and then removing the contaminant and the oil additive from the material by heating the admixture to a temperature which is slightly above the vaporization temperature of the oil and the contaminant at a pressure less than atmospheric pressure. As a general rule, the additive is admixed with the material after a preliminary dewatering or drying procedure, if needed, which removes excess water to facilitate handling. Drying of the material is unnecessary and should be avoided.

Illustrative oils include non-toxic non-hazardous oils such as tung oil, mineral oil, glycerin, cottonseed oil, linseed oil, kerosene, menhaden oil, pine oil and the like. Such oils can be used to desorb and volatilize the various congeners of polychlorinated biphenyls, naphthalene, dichlorobenzene, pentachlorophenol, and the like.

In general, the oils are used in amounts sufficient to permit desorption of substantially all of the target contaminant from the particulate porous material and maintain it in solution or suspension until volatilized out of the admixture. Generally amounts of about 1 to about 12 and preferably about 3 to 6 weight percent, based on the weight of material being treated, will be satisfactory. The use of excess additive may increase the residence time needed to achieve the degree of cleaning required. The oils can be admixed with the contaminated material continuously or batch-wise depending on the apparatus used to achieve decontamination.

It has been found advantageous to carry out the heating and volatilization of the target contaminant under reduced pressure and with introduction of an inert sweep gas such as nitrogen or carbon dioxide. The sweep gas percolates through the soil and carries the additive and contaminant vapors along. The flow rate of the sweep gas is not critical so long as there is sufficient flow to carry the contaminant vapors. Generally, flow rates of about 0.01 to about 0.06 cubic feet per hour have been found to be suitable. Pressures in the range of about 200 to about 450 mm of mercury are effective for volatilization at temperatures above the boiling point of the additive but below the boiling point of the polychlorinated biphenyl compounds. Temperatures in the range of 200° C. to about 350° C.

In general, a residence time of at least about four minutes at a temperature above the boiling point of the oil additive will reduce the concentration of contaminant to acceptable levels.

The process of this invention is suitable for use with natural soils which contain normal amounts of moisture. In general, moisture contents in the range of about 5 to 25 weight percent can be treated without need for dewatering.

The practice of this invention will be more clearly understood in light of the following experimental results.

The data in Table I below, was obtained by a series of experiments in which samples, approximately 100 grams each, of soil contaminated with varying amounts of common mixtures of polychlorinated biphenyl congeners were mixed with the indicated additive in a beaker and mixed with a spatula for several minutes. The admixture was transferred to a vacuum distillation apparatus and heated, under nitrogen, to the designated temperature at the designated pressure and held for the period of time shown. After each run the sample was cooled to room temperature, stored, and eventually analyzed for total polychlorinated biphenyl compounds content by EPA test method 8080.

TABLE 1

| RUN # | ADDITIVE | Polychlorinated Biphenyl Compounds Feed (PPM) | TEMP (C.) | VACUUM (mm Hg) | TIME AT TEMP. (min.) | Polychlorinated Biphenyl Compounds Final ppm |
|---|---|---|---|---|---|---|
| 4 | None | 8102 | 200 | 10 | 30 | 4144 |
| 5 | None | 8102 | 200 | atm. | 30 | 7594.9 |
| 52 | None | 26,000 | 300 | 200 | 0 | 2700 |
| 102 | None | 2500 | 300 | 200 | 20 | 830 |
| 7 | 1% glycerin | 8102 | 300 | atm. | 30 | 6.6 |
| 10 | 10% glycerin | 8102 | 200 | 5 | 30 | 960.6 |
| 11 | 1% glycerin | 8102 | 300 | atm. | 30 | 22.7 |
| 12 | 10% glycerin | 8102 | 300 | atm. | 30 | 1.2 |
| 16 | 10% glycerin | 8102 | 300 | 5 | 30 | 2 |
| 41 | 2.7% glycerin | 25 | 235 | 200 | 0 | 2.7 |
| 58 | 5.3% glycerol | 26,000 | 330 | 200 | 0 | 5.6 |
| 59 | 5.3% glycerol | 26,000 | 345 | 200 | 0 | 22 |
| 14 | 10% pine oil | 8102 | 300 | atm. | 2 | 21.1 |
| 15 | 10% pine oil | 8102 | 200 | 10 | 30 | 294 |
| 23 | 18% pine oil | 8102 | 220 | 200 | 5 | 1219 |
| 24 | 10% pine oil | 8102 | 300 | 200 | 5 | n.d. |
| 25 | 10% pine oil | 8102 | 300 | 200 | 0 | 3.1 |
| 31 | 7% pine oil | 25 | 300 | 200 | 0 | n.d. |
| 32 | 3% pine oil | 25 | 300 | 200 | 0 | n.d. |
| 33 | 1% pine oil | 25 | 300 | 200 | 0 | n.d. |
| 75 | 4% pine oil | 2500 | 300 | 200 | 4 | 70 |
| 22 | 10% light min. oil | 8102 | 300 | atm. | 20 | 4 |
| 47 | 3.6% min. oil | 26,000 | 300 | 200 | 0 | 71 |
| 54 | 10% min. oil | 26,000 | 300 | 200 | 0 | 73 |
| 56 | 5% min. oil + 2% Water | 26,000 | 300 | 200 | 0 | 93 |
| 71 | 4% min. oil | 41 | 300 | 200 | 2 | n.d. |
| 76 | 4% min. oil | 2500 | 300 | 200 | 4 | 110 |
| 79 | 2% min. oil | 41 | 300 | 200 | 4 | n.d. |
| 80 | .8% min. oil | 41 | 300 | 200 | 4 | n.d. |
| 81 | 4% min. oil | 2500 | 300 | 300 | 4 | 130 |
| 13 | 10% motor oil | 8102 | 300 | atm. | 30 | 2039 |
| 21 | 10% Lanceed oil | 8102 | 300 | atm. | 30 | 1607 |
| 104 | 4% Decyl Alcohol | 520 | 300 | 200 | 4 | 4 |
| 74 | 4% Ker | 2500 | 300 | 200 | 4 | 54 |
| 48 | 5.7% menh. oil | 26,000 | 300 | 200 | 0 | 460 |
| 42 | 29% water | 8102 | 300 | 200 | 0 | 77 |

To study the effect of oil addition to soils contaminated with semivolatile hydrocarbons other than polychlorinated biphenyl compounds, soil samples were contaminated with pentachlorophenol, naphthalene, and dichlorobenzene in the amounts shown in Table 2, below. Two runs were carried out for each hydrocarbon, one with 4% by volume mineral oil and one without. The samples were heated to 300° C. under nitrogen about 400 mm. (Hg) in a rotary kiln and held at 300° C. for four minutes. Comparative results are given below.

TABLE 2

| CONCENTRATION DETECTED IN SOILS (PPM) | | | |
|---|---|---|---|
| | Feed | No Oil | 4% Mineral Oil |
| Pentachlorophenol | 260 | 105 | 1.6 |
| Naphthalene | 330 | 3 | <0.33 |
| Dichlorobenzenes | 240 | 3 | <0.33 |

What we claim is:

1. A method for separating an organic chlorinated contaminant from an inert porous material which consists essentially of admixing the material with an oil selected from the group consisting of mineral oil and pine oil in an amount effective to desorb substantially all of the contaminant, heating the admixture to a temperature of about 200 ° C. to about 350 ° C. under vacuum of about 300 to 450 mm. of mercury while maintaining a flow an inert sweep gas, and collecting the vapors.

2. A method according to claim 1 in which the effective amount of the organic liquid is from about 1 to about 12 percent by weight, based on the weight of the porous inert material.

3. The method of claim 2, in which the effective amount of the organic liquid is from about 1 to about 12 percent by weight, based on the weight of the porous inert material.

4. A method for separating polychlorinated biphenyl compounds from soil which comprises admixing the soil with from about 1 to about 12 weight percent of a volatilizable organic liquid in which the polychlorinated biphenyl compounds are soluble, heating the admixture under vacuum to a temperature between about 200° C. and about 350° C. while maintaining a flow of an inert sweep gas, and collecting the vapors.

5. A method according to claim 4 in which the organic liquid is an oil and the admixture is heated to a temperature between about 200° C. and 350° C. and the sweep gas is nitrogen.

6. A method according to claim 4 in which the oil is selected from the group consisting of pine oil and mineral oil.

* * * * *